US008533982B2

(12) United States Patent
Rousey et al.

(10) Patent No.: US 8,533,982 B2
(45) Date of Patent: Sep. 17, 2013

(54) LICENSE PLATE HOLDER

(71) Applicants: Trent M. Rousey, Springfield, IL (US);
Andre H. Allen, Springfiled, IL (US);
Thomas J. Welsh, Jr., Aurora, IL (US)

(72) Inventors: Trent M. Rousey, Springfield, IL (US);
Andre H. Allen, Springfiled, IL (US);
Thomas J. Welsh, Jr., Aurora, IL (US)

( * ) Notice: Subject to any disclaimer, the term of this patent is extended or adjusted under 35 U.S.C. 154(b) by 0 days.

(21) Appl. No.: 13/657,626

(22) Filed: Oct. 22, 2012

(65) Prior Publication Data

US 2013/0097900 A1    Apr. 25, 2013

Related U.S. Application Data

(60) Provisional application No. 61/550,431, filed on Oct. 23, 2011.

(51) Int. Cl.
*G09F 7/00*    (2006.01)
(52) U.S. Cl.
USPC .................................. 40/209; 40/200; 40/210

(58) Field of Classification Search
USPC ............................................ 40/209, 643, 644
See application file for complete search history.

(56) References Cited

U.S. PATENT DOCUMENTS

| | | | | |
|---|---|---|---|---|
| 2,710,475 A * | 6/1955 | Salzmann | | 40/202 |
| 3,304,642 A * | 2/1967 | Dardis | | 40/209 |
| 5,983,539 A * | 11/1999 | Martin et al. | | 40/202 |
| 7,836,618 B1 * | 11/2010 | Parenti | | 40/209 |
| 7,866,071 B1 * | 1/2011 | Downey | | 40/209 |

* cited by examiner

*Primary Examiner* — Casandra Davis
(74) *Attorney, Agent, or Firm* — Michael Ries (57) ABSTRACT

A license plate holder that removably secures a license plate within the license plate holder that includes a back plate secured to a vehicle bumper of a vehicle, a pair of hinges, a plurality of storage pockets covered with an adhesive plastic covering, a plurality of threaded attachment screws contained in the storage pockets and a front frame coupled to the front frame with the pair of hinges and a snap lock. The license plate holder also includes a plurality of advertisement indicia, a pair of support frame apertures, a first pair of back plate apertures and a second pair of back plate apertures and a pair of support tabs used to support the license plate within the license plate holder.

20 Claims, 7 Drawing Sheets

LICENSE PLATE HOLDER

This application claims priority to U.S. Provisional Application 61/550,431 filed on Oct. 23, 2011, the entire disclosure of which is incorporated by reference.

TECHNICAL FIELD & BACKGROUND

Presently many car dealers use a frame-only license plate holder that surrounds a license plate. This frame serves two purposes. Before an automobile is purchased, an advertising card is typically placed within the frame. After the automobile is sold, the customer's license plate is installed within the frame. The frame is free advertising for the dealer. Test drives in the automobile do not use a license plate in the frame as that would require tools and a lot of extra effort. So there are other devices the dealer must purchase to temporarily attach a license plate to the vehicle.

The present invention generally relates to a holder. More specifically, the invention is a license plate holder.

It is an object of the invention to provide a license plate holder that relatively better retains and secures a vehicle license plate than a traditional frame-only license plate holder.

It is an object of the invention to provide a license plate holder that can be opened and closed with one hand.

It is an object of the invention to provide a license plate holder that displays a dealer advertisement when no license plate is installed.

What is really needed is a license plate holder that relatively better retains and secures a vehicle license plate than a traditional frame-only license plate holder that can be opened and closed with one hand and that displays a dealer advertisement when no license plate is installed.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
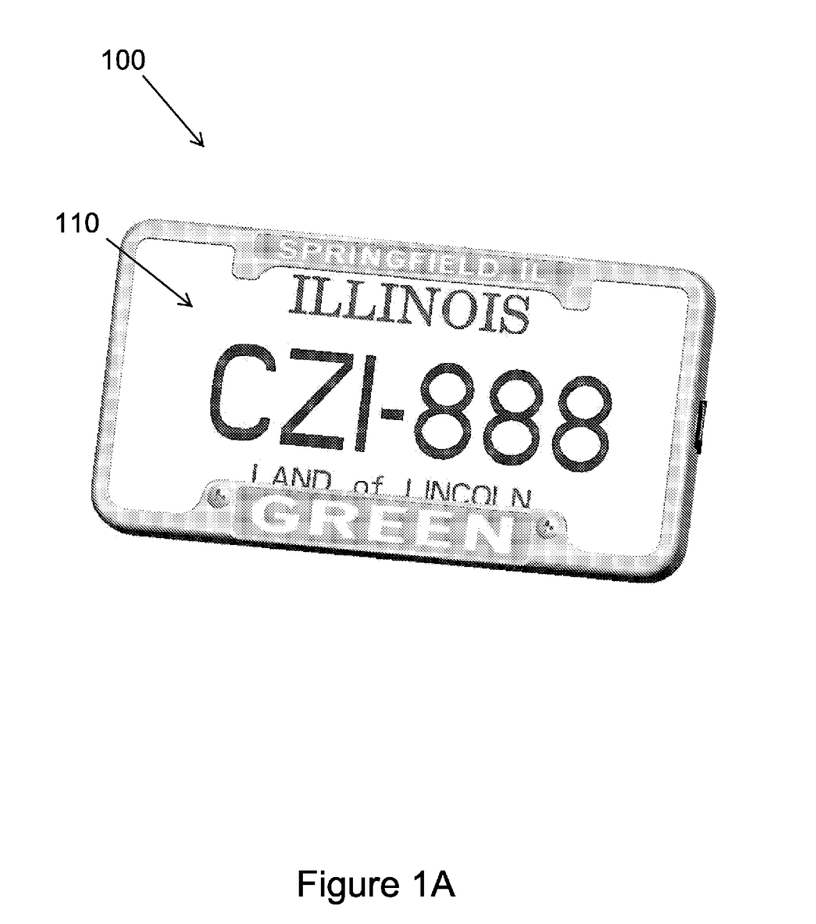
FIG. 1A illustrates an environmental front perspective view of a license plate holder in a closed position, in accordance with one embodiment of the present invention.

FIG. 1A illustrates an environmental front perspective view of a license plate holder 100 in a closed position, in accordance with one embodiment of the present invention.

The license plate holder 100 illustrated in FIG. 1A removably secures a license plate 110 within the license plate holder 100 and is in a closed position. The term removably secures is defined as being capable of removing the license plate 110 once it is secured within the license plate holder 100. Additional details regarding the license plate holder are provided in subsequent FIGS. 1B, 2A, 2B, 3A, 3B and 4.

Figure 1B:
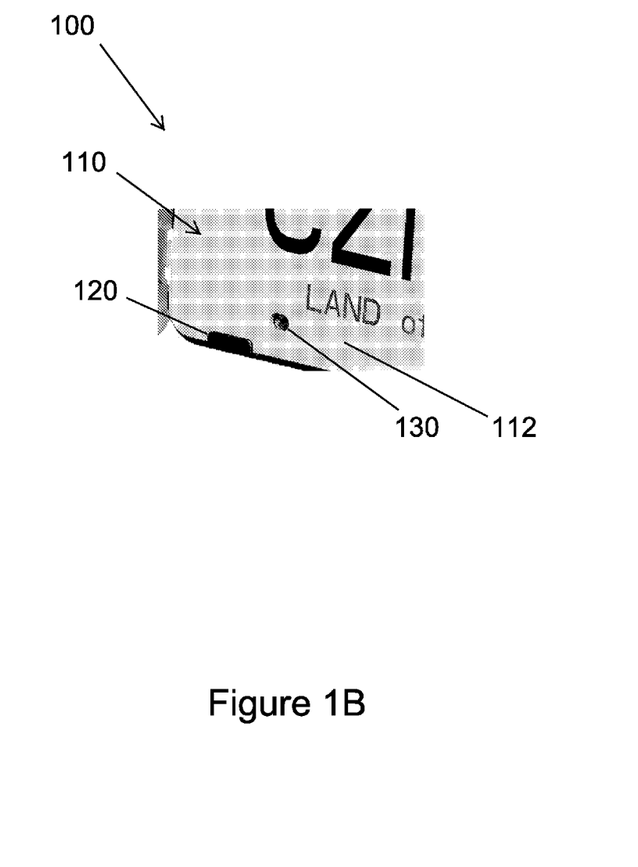
FIG. 1B illustrates an environmental front perspective view of a license plate holder in an open position, in accordance with one embodiment of the present invention.

FIG. 1B illustrates an environmental front perspective view of a license plate holder 100 in an open position, in accordance with one embodiment of the present invention. The license plate holder 100 and the license plate 110 illustrated in FIG. 1B is similar to the license plate holder 100 and the license plate 110 illustrated in FIG. 1A.

The license plate holder 100 includes a plurality of support tabs 120 and a plurality of license plate apertures 130. FIG. 1B illustrates only one of the support tabs 120 that support the license plate 110 within the license plate holder 100. The support tabs 120 are used to support the license plate 110 within the license plate holder 100. Additional details regarding the pair of support tabs 120 are provided in subsequent FIG. 2B. FIG. 1B illustrates only one of the license plate apertures 130 disposed on a bottom front facing 112 of the license plate 110 that can receive a fastener (not shown) to secure the license plate 110 to the license plate holder 100. Additional details regarding the license plate apertures 130 are provided in subsequent FIG. 2B.

Figure 2A:
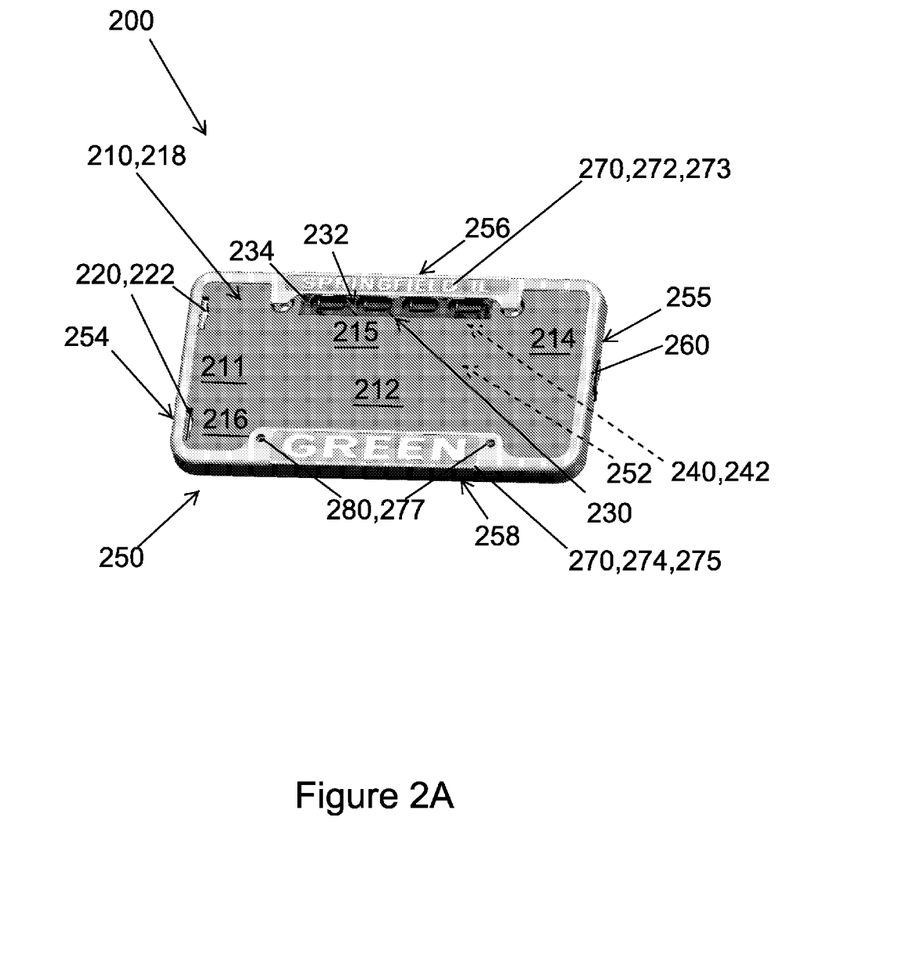
FIG. 2A illustrates a front perspective view of a license plate holder in a closed position, in accordance with one embodiment of the present invention.

FIG. 2A illustrates a front perspective view of a license plate holder 200 in a closed position, in accordance with one embodiment of the present invention.

The license plate holder 200 illustrated in FIG. 2A is similar to the license plate holder 100 illustrated in previous FIGS. 1A and 1B. However in contrast to FIGS. 1A and 1B, the license plate holder 200 illustrated in FIG. 2A is illustrated without a license plate 100.

The license plate holder 200 includes a back plate 210, a pair of hinges 220, a plurality of storage pockets 230, a plurality of attachment screws 240, a front frame 250, a snap lock 260, a plurality of advertisement indicia 270 and a pair of support frame apertures 280.

The back plate 210 is attached typically to a bumper B of a vehicle V, although the back plate 210 can be attached anywhere on a vehicle or other suitable object or surface. The back plate 210 includes a front facing 212, a side 214 and a bottom 216 and has a generally rectangular planar shape 218. The back plate 210 is made of rigid acrylonitrile butadiene styrene or ABS but can be made of any suitable material. Additional details regarding the back plate 210 are provided in subsequent FIGS. 2B, 3A, 3B and 4. The pair of hinges 220 is disposed on a first side 211 of the front facing 212 of the back plate 210. The pair of hinges 220 can be a pair of living hinges 222 that are relatively thin and flexible that allows the back plate 210 and the front frame 250 to bend along each of the pair of living hinges 222. The pair of living hinges 222 is relatively inexpensive, easy to manufacture, utilizes relatively little friction and are subjected to much less wear than traditional hinges. The pair of hinges 220 is made of polypropylene but can be made of any suitable material. The storage pockets 230 are disposed on a top portion 215 of the front facing 212 of the back plate 210. There are 4 storage pockets 230 illustrated in FIG. 2A but any suitable number of storage pockets 230 can be disposed on a top portion 215 of the front facing 212 of the back plate 210. The storage pockets 230 are covered with an adhesive plastic covering or MYLAR™ covering 232 to protect what is contained in the storage pockets 230. The adhesive plastic covering 232 also includes a protruding corner 234 that is easily grasped to remove the adhesive plastic covering 232 disposed on the storage pockets 230. The attachment screws 240 are contained in the storage pockets 230. Typically one attachment screw 240 is contained in each storage pocket 230. The attachment screws 240 are threaded attachment screws 242 to facilitate penetration and provide enhanced securing capability. Additional details regarding the attachment screws 240 are illustrated in subsequent FIG. 2B and FIG. 4.

The front frame 250 includes an open middle portion 252, a first side 254, a second side 255, a top 256 and a bottom 258. The front frame 250 is swingably coupled to the back plate 210 with the pair of hinges 220 and opens and closes the license plate holder 200 to allow a user to insert the license plate 210 into the license plate holder 200. The term swingably coupled is defined as being coupled to the back plate 210 and the front frame 250 and allowing the back plate 210 and the front frame 250 to swing open and close while being coupled with the pair of hinges 220. The pair of living hinges 222 can also snap lock into the front frame 250 and the back plate 210 forming the back plate 210 and the front frame 250 into a single solid piece. The front frame 250 is made of rigid acrylonitrile butadiene styrene or ABS but can be made of any suitable material. The snap lock 260 is disposed on the side 214 of the back plate 210 and releasably secures the back plate 210 and the front frame 250 together to thereby enclose the license plate holder 200. The term releasably secures is defined as securing the back plate 210 and the front frame 250 together while also allowing the secured back plate 210 and the secured front frame 250 to be released as desired by a user. Additional details regarding the snap lock 260 are illustrated in subsequent FIG. 3A and FIG. 3B. The advertisement indicia 270 include a first advertisement indicia 272 and a second advertisement indicia 274. The first advertisement indicia 272 indicate a location of a vehicle dealer 273 associated with the license plate holder 200. As illustrated in FIG. 2A, the first advertisement indicia 272 is disposed on the top 256 of the front frame 250 but can be disposed on any suitable location of the front frame 250 that includes the bottom 258 of the front frame 250. The second advertisement indicia 274 indicate a name of a vehicle dealer 275 associated with the license plate holder 200. As illustrated in FIG. 2A, the second advertisement indicia 274 is disposed on the bottom 258 of the front frame 250 but can be disposed on any suitable location of the front frame 250 that includes the top 256 of the front frame 250. The pair of support frame apertures 280 is disposed on each side 277 of the second advertisement indicia 274 on the bottom 258 of the front frame 250. The attachment screws 240 are screwed into each of the pair of support frame apertures 280 and correspond to the license plate apertures 130 disposed on a bottom front facing 112 of the license plate 110 to secure the license plate 110 to the license plate holder 100 illustrated in FIG. 1B.

Using separate components of the license plate holder provides much greater flexibility for marketing colorization and plating. The license plate holder can also utilize one or more than two hinges, or utilize other interlocking features on the frame and the back plate that allow motion of the frame to open the license plate holder. It is preferable to open the license plate holder without decoupling the components of the license plate holder to prevent dropping the frame on the ground or losing it.

The purpose of the license plate holder is to provide an improved device to display advertising and retain an automobile license plate. The license plate holder is fastened to an automobile or vehicle with two of four typical threaded fasteners. These fasten a back plate to an automobile bumper. A front frame is coupled to the back plate in one or more places to allow rotation of the front frame and to open and close the license plate holder, without separation of the components of the license plate holder. The front frame and the back plate incorporate at least one locking feature to hold the license plate holder closed without the need for additional fasteners. The locking feature automatically locks the license plate holder closed when the front frame is pushed fully closed, and can be unlocked with one hand and without the use of any tools to allow the license plate holder to open.

The back plate is visible through an opening in the front frame to display dealer advertising when no license plate is installed and provides viewing area of an installed license plate typical of an existing license plate holder. The license plate holder holds an automobile license plate that is contained within the locked license plate holder to allow test driving of an automobile. Thus, there is no need to use auxiliary fasteners, or a magnetic plate holder to attach the license plate to the automobile. The license plate holder can be opened to take out the license plate. The license plate holder can be used and re-used with a simple one-hand operation without the use of tools. When the automobile is sold, the owner's license plate is placed inside the license plate holder, the front-frame is closed, and at least one threaded fastener extends through the front plate and the license plate and engages either the back plate or the first set of fasteners or the automobile bumper. This mechanically fastens the license plate with similar capability as currently existing license plate frames.

There are a number of advantages to the license plate holder. The license plate holder is fastened to the automobile once without the need to remove it. The license plate holder can be opened to insert an advertising card or a license plate. The license plate holder can replace the need for inserted advertising cards. The license plate holder can be re-used (opened and locked closed). A car dealer no longer needs alternate temporary license plate fastener devices. The license plate holder allows permanent plate mounting and license plate holder closure.

Figure 2B:
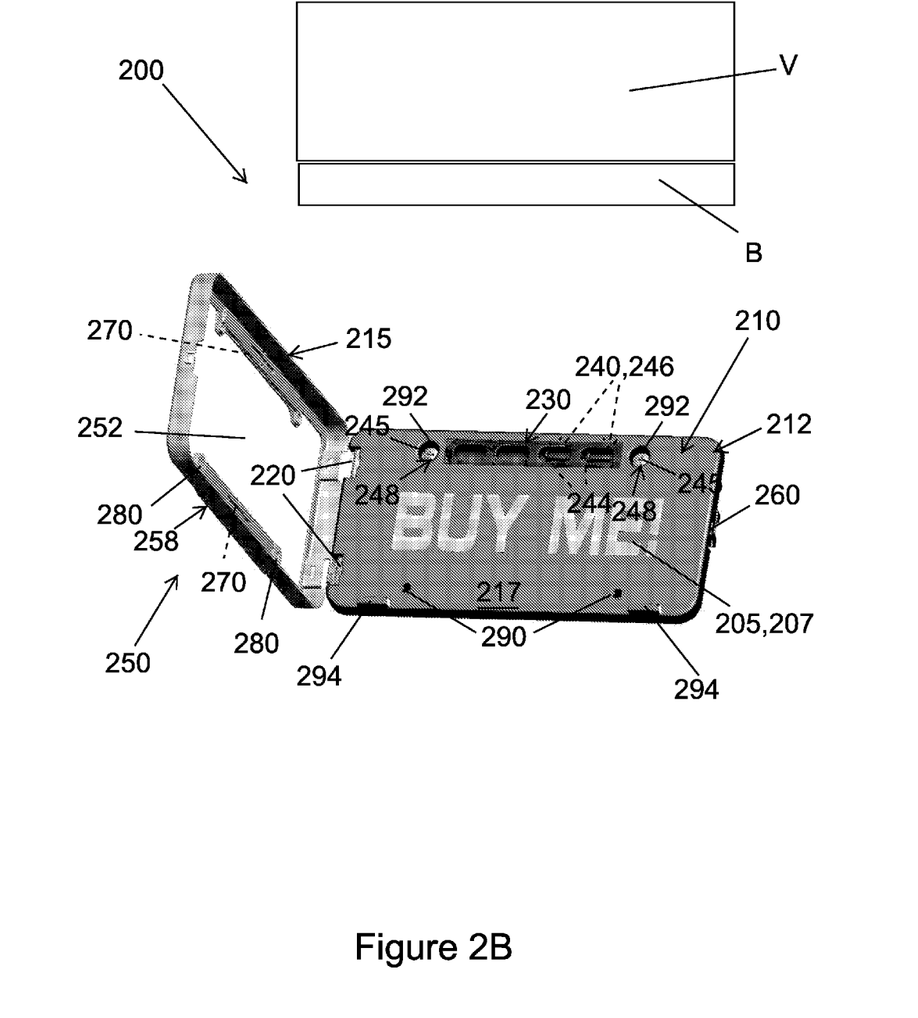
FIG. 2B illustrates a front perspective view of a license plate holder in an open position, in accordance with one embodiment of the present invention.

FIG. 2B illustrates a front perspective view of a license plate holder 200 in an open position, in accordance with one embodiment of the present invention.

The license plate holder 200, the back plate 210, the pair of hinges 220, the plurality of storage pockets 230, the plurality of attachment screws 240, the front frame 250, the snap lock 260, the plurality of advertisement indicia 270 and the pair of support frame apertures 280 illustrated in FIG. 2A are similar to the license plate holder 200, the back plate 210, the pair of hinges 220, the plurality of storage pockets 230, the plurality of attachment screws 240, the front frame 250, the snap lock 260, the plurality of advertisement indicia 270 and the pair of support frame apertures 280 illustrated in FIG. 2B.

The license plate holder 200 additionally includes a third advertisement indicia 205, a first pair of back plate apertures 290, a second pair of back plate apertures 292 and a pair of support tabs 294. The third advertisement indicia 205 is disposed on and is visible through the open middle portion 252 of the front frame 250 when the license plate (FIG. 1A, 110) is removed. The third advertisement indicia 205 can be silk screen printed onto the back plate 210 or be any other suitable advertisement indicia. The third advertisement indicia 205 can be a dealer advertising message 207 or any other suitable advertisement indicia. FIG. 2B illustrates the advertising message 207 "Buy Me!" but can be any other suitable dealer advertising message. The first pair of back plate apertures 290 is disposed on a bottom front facing 217 of the back plate 210 and corresponds with the pair of support frame apertures 280. A first pair of attachment screws 246 is screwed into the pair of support frame apertures 280 and the first pair of back plate apertures 290 to secure the front frame 250 to the back plate 210. The first pair of back plate apertures 290 is recessed to prevent contact with a screw head 244 from each of the first pair of attachment screws 246. The second pair of back plate apertures 292 is disposed on each side of the storage pockets 230 disposed on the top portion 215 of the front facing 212 of the back plate 210. A second pair of attachment screws 248 is screwed into the second pair of back plate apertures 292 and the bumper B of the vehicle V to secure the back plate 210 to the bumper B of the vehicle V or any other suitable object or surface. The second pair of back plate apertures 292 is recessed to prevent contact with a screw head 245 from each of the second pair of attachment screws 248. The pair of support tabs 294 illustrated in FIG. 2B is similar to the pair of support tabs 120 illustrated in previous FIG. 1B. As previously described in FIG. 1B, the support tabs 294 are used to support the license plate (FIG. 1B, 110) within the license plate holder 200. The support tabs 294 are also covered by the bottom 258 of the front frame 250 when the license plate holder 200 is in a closed position as illustrated in FIG. 2A.

Figure 3A:
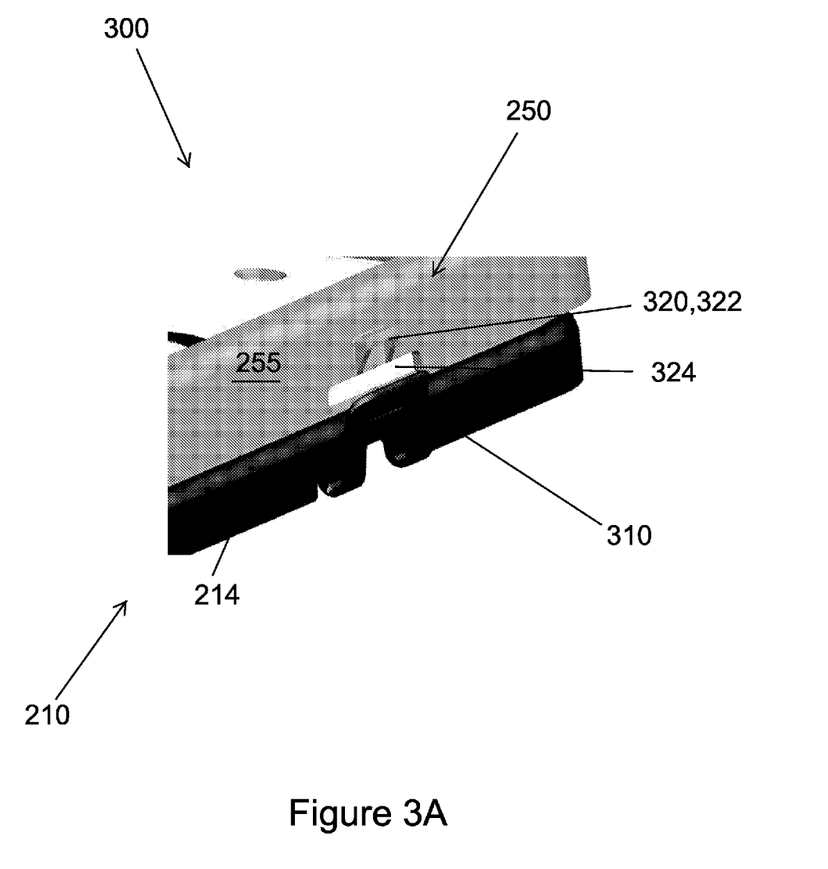
FIG. 3A illustrates a side perspective view of a snap lock and lock tab of a license plate holder in an unlocked position, in accordance with one embodiment of the present invention.

FIG. 3A illustrates a side perspective view of a snap lock 310 and lock tab 320 of a license plate holder 300 in an unlocked position, in accordance with one embodiment of the present invention. The license plate holder 300 and the snap lock 310 illustrated in FIG. 3A are similar to the license plate holder 200 and the snap lock 260 illustrated in FIG. 2A.

The license plate holder 300 also includes a lock tab 320. The lock tab 320 is triangular-shaped protruding lock tab 322 that is disposed on the second side 255 of the front frame 250. The triangular-shaped protruding tab 322 is well-suited to engage the snap lock 310 in contrast to other different shaped protruding tabs. There is also an open slot 324 underneath the lock tab 320 that allows the lock tab 320 to provide a relatively stronger engagement with the snap lock 310, which as previously described is disposed on the side 214 of the back plate 210.

Figure 3B:
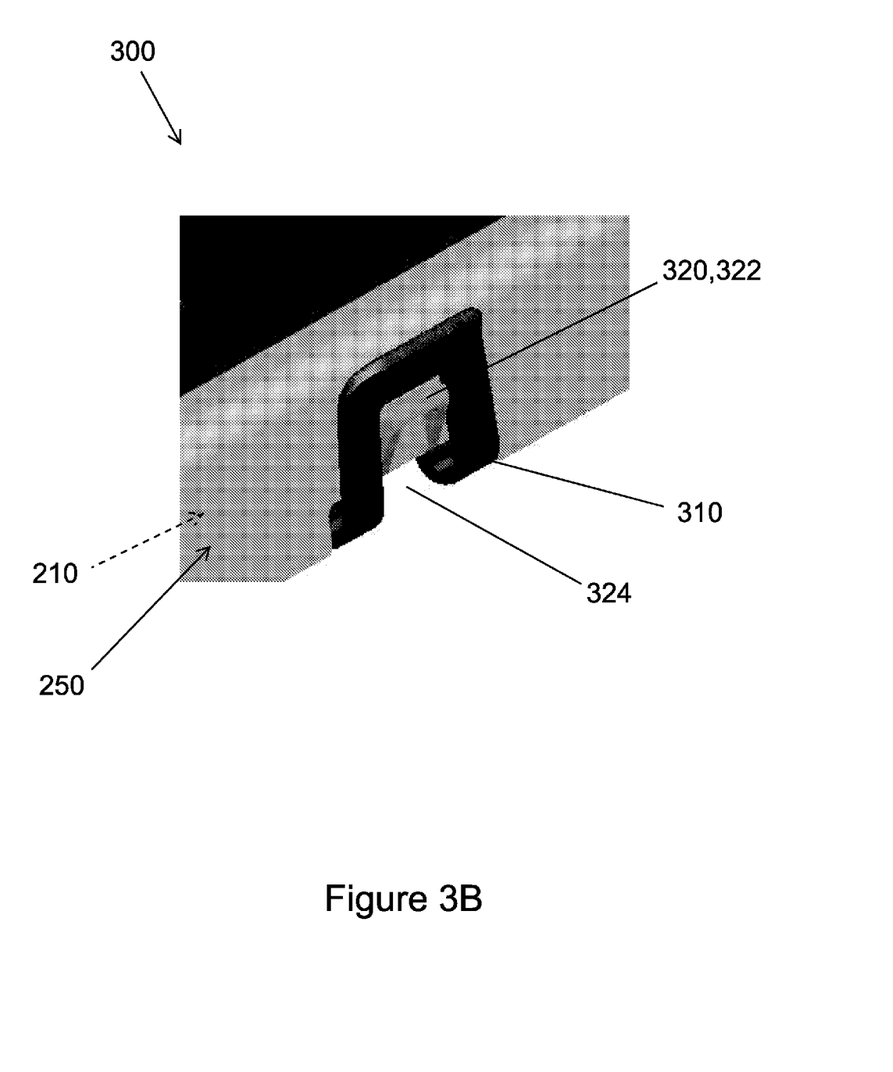
FIG. 3B illustrates a side perspective view of a snap lock and lock tab of a license plate holder in a locked position, in accordance with one embodiment of the present invention.

FIG. 3B illustrates a side perspective view of a snap lock 310 and lock tab 320 of a license plate holder 300 in a locked position, in accordance with one embodiment of the present invention. The snap lock 310, the lock tab 320 and the license plate holder 300 illustrated in FIG. 3A is similar to the snap lock 310, the lock tab 320 and the license plate holder 300 illustrated in FIG. 3B. The snap lock 310 is engaged with the lock tab 320 as the front frame 250 is closed down on the back plate 210. The snap lock 310 can be pulled away from the back plate 210 to release engagement with the lock tab 320 and allow the front frame 250 to swing open. The snap lock 310 can be pulled away with a user's one hand to facilitate convenience of opening the license plate holder 300.

Figure 4:
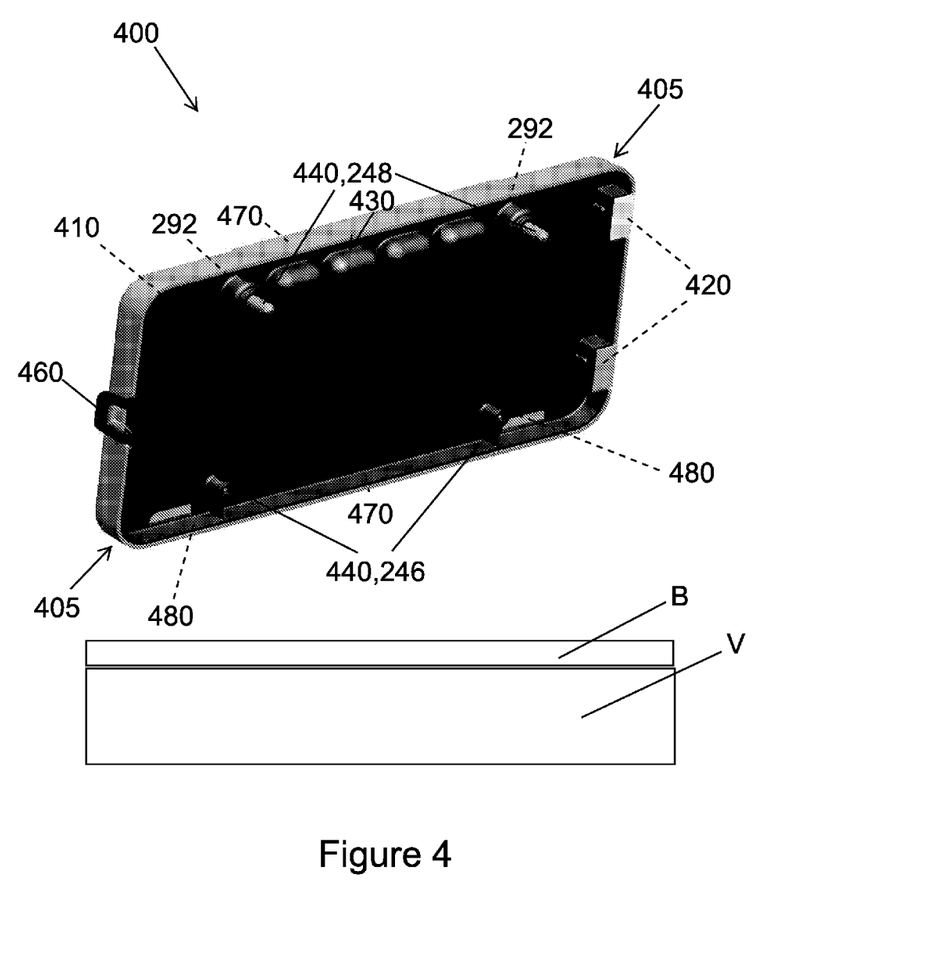
FIG. 4 illustrates a back perspective view of a license plate holder, in accordance with one embodiment of the present invention.

FIG. 4 illustrates a back perspective view of a license plate holder 400, in accordance with one embodiment of the present invention. The license plate holder 400, the back plate 410, the pair of hinges 420, the plurality of storage pockets 430, the plurality of attachment screws 440, the front frame 450, the snap lock 460, the plurality of advertisement indicia 470 and the pair of support frame apertures 480 illustrated in FIG. 4 are similar to the license plate holder 200, the back plate 210, the pair of hinges 220, the plurality of storage pockets 230, the plurality of attachment screws 240, the front frame 250, the snap lock 260, the plurality of advertisement indicia 270 and the pair of support frame apertures 280 illustrated in FIG. 2B.

The license plate holder 400 illustrated in FIG. 4 also includes a raised perimeter 405 to slightly raise the back plate 410 of the license plate holder 400. FIG. 4 also illustrates the second pair of attachment screws 248 screwed into the second pair of back plate apertures 292 and the bumper B of the vehicle V to secure the back plate 410 to the bumper B of the vehicle V or any other suitable object or surface as previously described in the FIG. 2B description. FIG. 4 also illustrates the first pair of attachment screws 246 that are relatively shorter than the second pair of attachment screws 248 and do not extend into the bumper B of the vehicle V.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A license plate holder that removably secures a license plate within the license plate holder, the license plate with a bottom front facing, comprising:
  a back plate with a front facing, a side, a bottom and a generally rectangular planar shape, the back plate is secured to a bumper of a vehicle, the front facing having a first side and a top portion;
  a pair of hinges disposed on the first side of the front facing of the back plate;
  a plurality of storage pockets disposed on a top portion of the front facing of the back plate, the storage pockets are covered with an adhesive plastic covering to protect what is contained in the storage pockets;
  a plurality of threaded attachment screws adapted to be contained in the storage pockets, the threaded attachment screws include a first pair of threaded attachment screws and a second pair of threaded attachment screws, the first pair of threaded attachment screws and the second pair of threaded attachment screws to facilitate penetration and provide enhanced securing capability;
  a front frame with an open middle portion, a first side, a second side, a top and a bottom, the front frame is swingably coupled to the back plate and the front frame with the pair of hinges, the pair of hinges opens and closes the license plate holder to allow a user to insert the license plate into the license plate holder to be removably secured;

a snap lock disposed on the side of the back plate and a lock tab disposed on the second side of the front frame, the lock tab engages the snap lock to releasably secure the back plate and the front frame together to enclose the license plate holder; a plurality of advertisement indicia that includes a first advertisement indicia and a second advertisement indicia, the first advertisement indicia indicate a location of a vehicle dealer associated with the license plate holder, the second advertisement indicia indicate a name of a vehicle dealer associated with the license plate holder;

a pair of support frame apertures disposed on each side of the second advertisement indicia, the second advertisement indicia is disposed on the bottom of the front frame, the first pair of threaded attachment screws are screwed into the pair of support frame apertures and a pair of license plate apertures disposed on a bottom front facing of the license plate that correspond to the pair of support frame apertures, the first pair of threaded attachment screws secure the license plate to the license plate holder;

a first pair of back plate apertures and a second pair of back plate apertures, the first pair of back plate apertures is disposed on a bottom front facing of the back plate and corresponds with the pair of support frame apertures, the second pair of back plate apertures are disposed on each side of the storage pockets, the first pair of back plate apertures is recessed to prevent contact with a screw head from each of the first pair of attachment screws, a second pair of attachment screws is screwed into the second pair of back plate apertures and the bumper of the vehicle, the second pair of attachment screws secures the back plate to the bumper of the vehicle, the second pair of back plate apertures is recessed to prevent contact with a screw head from each of the second pair of attachment screws; and a pair of support tabs used to support the license plate within the license plate holder.

2. The license plate holder according to claim 1, wherein the front facing of the back plate includes a third advertisement indicia.

3. The license plate holder according to claim 2, wherein the third advertisement indicia is a dealer advertising message.

4. The license plate holder according to claim 2, wherein the third advertisement indicia is visible through the open middle portion of the front frame when the license plate is removed.

5. The license plate holder according to claim 2, the third advertisement indicia is silk screen printed onto the back plate.

6. The license plate holder according to claim 1, wherein the back plate is made of rigid acrylonitrile butadiene styrene.

7. The license plate holder according to claim 1, wherein the pair of hinges is a pair of living hinges that are thin, flexible, inexpensive, easy to manufacture, utilize little friction and are subject to less wear.

8. The license plate holder according to claim 7, wherein the pair of living hinges allows the back plate and the front frame to bend along the pair of living hinges.

9. The license plate holder according to claim 7, wherein the pair of living hinges snap locks into the front frame and the back plate connecting the back plate and the front frame.

10. The license plate holder according to claim 7, wherein the pair of living hinges are made of polypropylene material.

11. The license plate holder according to claim 1, wherein the adhesive plastic covering includes a protruding corner, the protruding corner is grasped to remove the adhesive plastic covering disposed on the storage pockets.

12. The license plate holder according to claim 1, wherein one threaded attachment screw from the threaded attachment screws is contained in each of the storage pockets.

13. The license plate holder according to claim 1, wherein an advertisement is removably secured by the pair of support tabs.

14. The license plate holder according to claim 13, wherein the advertisement inserted into the license plate holder is a dealer advertisement.

15. The license plate holder according to claim 1, wherein the front frame is made of rigid acrylonitrile butadiene styrene.

16. The license plate holder according to claim 1, wherein the lock tab is a triangular-shaped protruding lock tab.

17. The license plate holder according to claim 1, wherein an open slot underneath the lock tab allows the lock tab to provide a stronger engagement with the snap lock.

18. The license plate holder according to claim 1, wherein the snap lock is adapted to be pulled away with a user's one hand to facilitate convenience of opening the license plate holder.

19. The license plate holder according to claim 1, wherein the support tabs are covered by the bottom of the front frame when the license plate holder is in a closed position.

20. The license plate holder according to claim 1, wherein the licensed plate holder includes a raised perimeter to raise the back plate.

* * * * *